United States Patent [19]
Lanting et al.

[11] Patent Number: 5,348,267
[45] Date of Patent: Sep. 20, 1994

[54] APPARATUS FOR ISOLATING A SENSOR

[75] Inventors: Mark L. Lanting, Portage; Alan R. Davis, Plainwell; Stephen A. Edelen, Battle Creek, all of Mich.

[73] Assignee: Eaton Corporation, Cleveland, Ohio

[21] Appl. No.: 947,148

[22] Filed: Sep. 18, 1992

[51] Int. Cl.5 ............................................. F16M 13/00
[52] U.S. Cl. ................................... 248/635; 248/636; 248/638; 267/136; 267/293
[58] Field of Search ............... 248/609, 632, 635, 636, 248/638; 267/153, 136, 141.2, 141.3, 141.4, 141.5, 293

[56] References Cited

U.S. PATENT DOCUMENTS

| | | | |
|---|---|---|---|
| 4,033,533 | 7/1977 | Evrard | 248/632 |
| 4,286,777 | 9/1981 | Brown | 248/635 X |
| 4,452,417 | 6/1984 | Krafthefer et al. | 248/635 X |
| 4,469,303 | 9/1984 | Snyder | 248/634 |
| 4,530,491 | 7/1985 | Bucksbee et al. | 267/141.2 X |
| 4,681,293 | 7/1987 | Cucci et al. | 248/603 |
| 4,783,039 | 11/1988 | Peterson et al. | 248/635 |
| 4,858,880 | 8/1989 | Durand | 248/635 |
| 4,894,638 | 1/1990 | Flierl et al. | 338/162 |
| 5,110,081 | 5/1992 | Lang, Jr. | 248/635 |
| 5,174,540 | 12/1992 | Gilliam | 248/635 |

*Primary Examiner*—Eugenia Jones
*Attorney, Agent, or Firm*—Brooks & Kushman

[57] ABSTRACT

Apparatus is provided for isolating a sensor from a vibrating surface. The sensor has first and second spaced surfaces, a bore extending between the surfaces and a groove in the second surface. The apparatus includes a flanged sleeve adapted to extend through the bore to the vibrating surface. The sleeve is sufficiently long when extending through the bore to provide a first gap between the vibrating surface and the second surface of the sensor and sufficiently narrow when extending through the bore to provide a second gap between the sleeve and the sensor. The flange overlays the first surface of the sensor and the second gap. The apparatus also includes a bolt, which extends through the bore and into engagement with the vibrating surface, for attaching the sleeve to the vibrating surface. The apparatus also includes a first O-ring positioned between the first surface of the sensor and the sleeve flange and a second O-ring positioned in the groove of the second surface. The first O-ring spaces the sensor from the sleeve and the flange and the second O-ring is adapted to abut the vibrating surface and space the sensor from the vibrating surface and the sleeve, such that the sensor floats between the first and second O-rings in isolation from the sleeve and the vibrating surface.

14 Claims, 3 Drawing Sheets

APPARATUS FOR ISOLATING A SENSOR

TECHNICAL FIELD

The present invention relates to isolating a sensor and, more particularly, to isolating a sensor mounted to a vehicular drivetrain component subject to vibrations.

BACKGROUND ART

As the use of electronics on vehicles continues to gain wider acceptance, applications for electronic control grow. With these new applications comes the need to provide the electronic control module with data which is typically gathered by sensors. Sensors that are directly mounted to vehicular drivetrain components are subjected to very nigh frequency vibrations generated by transmission gearing and the like. Certain types of sensors, however, are sensitive to these vibrations and suffer from degraded performance. Additional constraints, such as the requirement of maintaining a fluid seal between the sensor and the vehicular drivetrain component further complicate the problem.

The prior art teaches various methods of isolating sensors from vibrations. For example, U.S. Pat. No. 4,469,303, issued on Sep. 4, 1984 to Snyder, discloses a vibration isolation apparatus for supporting a sensor housing on a surface to which vibrations are applied. Elastic material is placed outboard of the sensor housing and skewed therefrom to place at least one-half of the columns of elastic material in compression responsive to linear vibrations along at least two axes of the housing. Linear vibration in all three axes of the housing is reduced, improving the reduction over known methods by reducing angular acceleration about a desired axis of the sensor housing by placing the elastic material of all columns in compression or tension.

U.S. Pat. No. 4,681,293, issued on Jul. 21, 1987 to Cucci et al., discloses an isolating mount for an external vibration sensitive sensor. The vibration mounting comprises a columnar or beam member made up of a series of spaced, generally parallel shims molded into a beam with a suitable elastomeric material between the shims. The compressional stiffness of the member is high while the shear stiffness is controlled to provide a low resonant frequency and the necessary support in the linear axes of vibration. In the preferred embodiment, the spacing of the shims is increased in the central portions of the beam members to obtain a substantially linear deflection from end-to-end when the beam members are moved in shear transverse to their longitudinal axes, yet providing adequate stiffness and compression along the longitudinal axis of the separate beams.

U.S. Pat. No. 4,894,638, issued on Jan. 16, 1990 to Flierl et al., discloses a potentiometer having vibration damping means. The potentiometer has a housing divided into an outer housing and an inner housing which is largely disposed inside the outer housing. Both housings are connected by a springy damping member. The flange and the electrical terminals are retained at the outer housing and both the resistor plate and the actuator member at the inner housing. Instead of uncoupling the entire potentiometer from the object with respect to vibrations, only certain component parts that are subject to wear are uncoupled. As the outer housing is connected rigidly to the other object, the respective position in space of the potentiometer and the other object is defined clearly so that any adjusting becomes almost superfluous and faulty installation is avoided.

These existing apparatus and methods, however, have a relatively high cost associated therewith. Additionally, space restrictions, clearance problems and the like associated with direct mounted sensors often preclude use of existing apparatus and methods.

SUMMARY OF THE INVENTION

It is an object of the present invention to provide an improved apparatus and method for isolating a sensor from a vibrating surface.

It is an additional object of the present invention to provide an improved apparatus and method for isolating a sensor that is directly mounted to a vehicle drivetrain component from 3-axis, high-frequency vibrations.

In carrying out the above objects and other objects and features of the present invention, an apparatus is provided for isolating a sensor from a vibrating surface. The sensor has first and second spaced surfaces, a bore extending between the surfaces and a groove in the second surface. The apparatus comprises a sleeve adapted to extend through the bore to the vibrating surface. The sleeve is sufficiently long when extending through the bore to provide a first gap between the vibrating surface and the second surface of the sensor and sufficiently narrow when extending through the bore to provide a second gap between the sleeve and the sensor in the bore. The sleeve includes a flange at one end overlaying the first surface of the sensor and the second gap. The apparatus also comprises means for fixedly attaching the sleeve to the vibrating surface. The attaching means extends through the bore and into engagement with the vibrating surface. The apparatus also comprises a first elastomeric isolation means positioned between the first surface of the sensor and the sleeve flange where it overlays the first surface and the second gap. The first elastomeric isolation means spaces the sensor from the sleeve and the flange. Lastly, the apparatus comprises a second elastomeric isolation means positioned in the groove of the second surface and adapted to abut the vibrating surface and space the sensor from the vibrating surface and the sleeve, such that the sensor floats between the first and second elastomeric isolation means in isolation from the sleeve and the vibrating surface.

In their preferred construction, the first and second elastomeric isolation means are O-rings. In an alternate embodiment, the first elastomeric isolation means comprises a plurality of grommets.

The advantages accruing to the present invention are numerous. For example, the apparatus of the present invention presents a low cost solution to the problem of effectively isolating a vibration sensitive sensor directly mounted to a vibrating surface.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
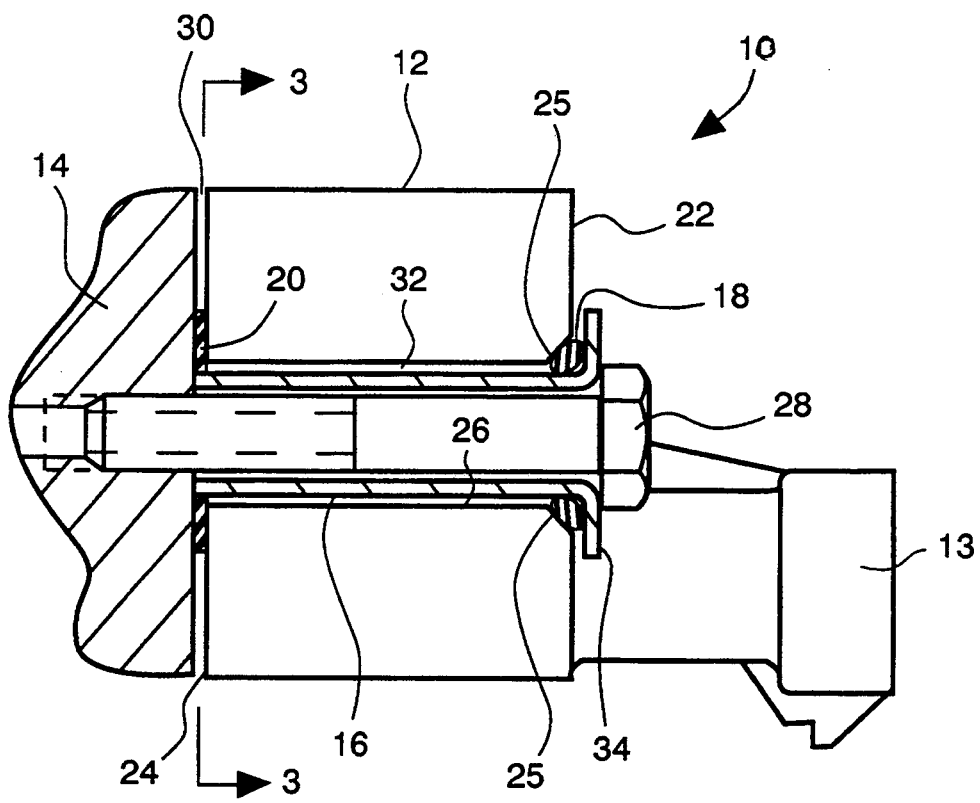
FIG. 1 is a fragmentary cross-sectional view of the apparatus of the present invention.

Referring now to FIG. 1, there is illustrated an apparatus, shown generally by reference numeral 10, for isolating a sensor 12 from a vibrating surface 14. In the preferred embodiment, the sensor 12 is a commercially available rotary potentiometer and the vibrating surface is a vehicle drivetrain component, such as an electrically actuated shift mechanism, subject to 3-axis, high-frequency vibrations from transmission gearing and the like. The sensor 12 is directly mounted and fixedly attached to the vibrating surface 14. As best shown in FIG. 1, the apparatus 10 includes a pair of sleeves 16 (only one shown), first elastomeric isolation means, or O-ring, 18 (only one shown) and second elastomeric isolation means, or O-ring, 20. The sensor 12 includes a connector portion 13 which receives a mating connector portion not specifically illustrated.

Figure 3:
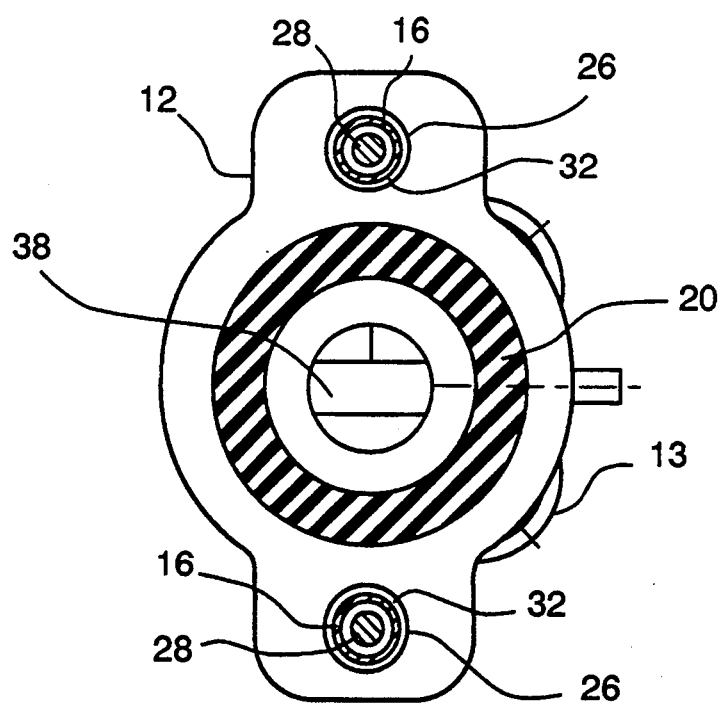
FIG. 3 is an end view of the apparatus shown in FIG. 1 taken along line 3—3, illustrating the side of the sensor proximate the vibrating surface.

With combined reference to FIGS. 1 and 3, the sensor 12 has a first surface 22, a second surface 24 spaced from the first surface and a pair of bores 26, which both preferably extend through the sensor 12 between the first surface 22 and the second surface 24. As illustrated, a chamfer 25 is formed on the first surface 22 about each bore 26, which cooperates with the O-ring 18, as described in greater detail below. Alternatively, a notch or groove could be utilized instead of the chamfer 25.

With additional reference to FIG. 2, the second surface 24 of the sensor 12 includes a groove 36 formed thereon which receives the O-ring 20, as described in greater detail below. As best shown in FIG. 3, the groove 36 is generally circular in shape, having a depth of approximately 0.087".

With continuing reference to FIGS. 1 and 3, the bores 26 each receive attaching means, such as a bolt 28 or the like, which cooperates with the sleeve 16 for fixedly attaching the sensor 12 to the vibrating surface 14. As previously mentioned, the apparatus 10 preferably includes a pair of sleeves 16, each adapted to extend through a respective bore 26 to the vibrating surface 14. A cross-sectional view of the sleeve 16 is shown in FIG. 4.

Figure 4:
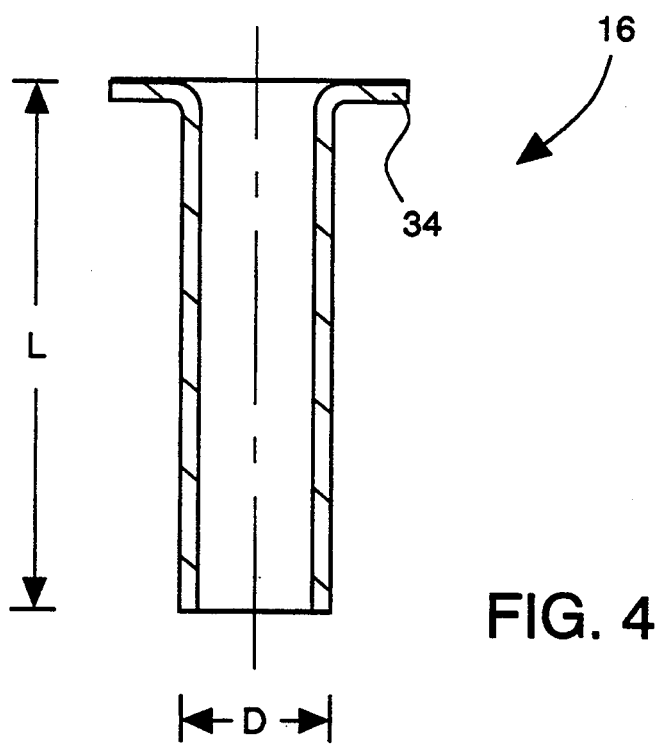
FIG. 4 is a cross-sectional view of the sleeve shown in FIG. 1.

Referring now to FIGS. 1 and 4, each sleeve 16 preferably has a sufficient length L, such that when the sleeve extends through a bore 26 to the vibrating surface 14, a first gap 30 is provided between the vibrating surface 14 and the second surface 24 of the sensor. Each sleeve 16 also preferably has a diameter D that is sufficiently small, such that when the sleeve 16 extends through the bore 26, a second gap 32 is provided between the sleeve 16 and the sensor in the bore.

As best shown in FIG. 4, each sleeve 16 includes a flange 34. As shown in FIG. 1, the flange 34 is sized to overlay the first surface 22 of the sensor 12 and the second gap 32. In one embodiment, the sleeve 16 could be generally tubular and cooperate with a washer, not specifically illustrated, similarly sized to overlay the first surface 22 of the sensor 12 and the second gap 32. Alternatively, the sleeve 16 and the flange 34 are preferably formed as a unitary piece as shown.

With reference to FIG. 1, with the apparatus assembled, each O-ring 18 is positioned around an associated sleeve 16, such that the O-ring is disposed at the chamfer 25, between the first surface 22 and the flange 34 where it overlays the first surface and the second gap 32. In the preferred embodiment, the O-ring 18, such as that commercially available from Parker Seal Company, of Lexington, Ky., United States of America, has a thickness between 0.067" and 0.073" and is constructed of an elastomeric material, such as rubber. Most preferably, the O-ring 18 has a Durometer hardness of about 70, a tensile strength in the range of 7–14 MPa and a minimum percent ultimate elongation of about 175. As shown in FIG. 1, the O-ring 18 helps to space the sensor 12 from the sleeve 16 and the flange 34.

Figure 2:
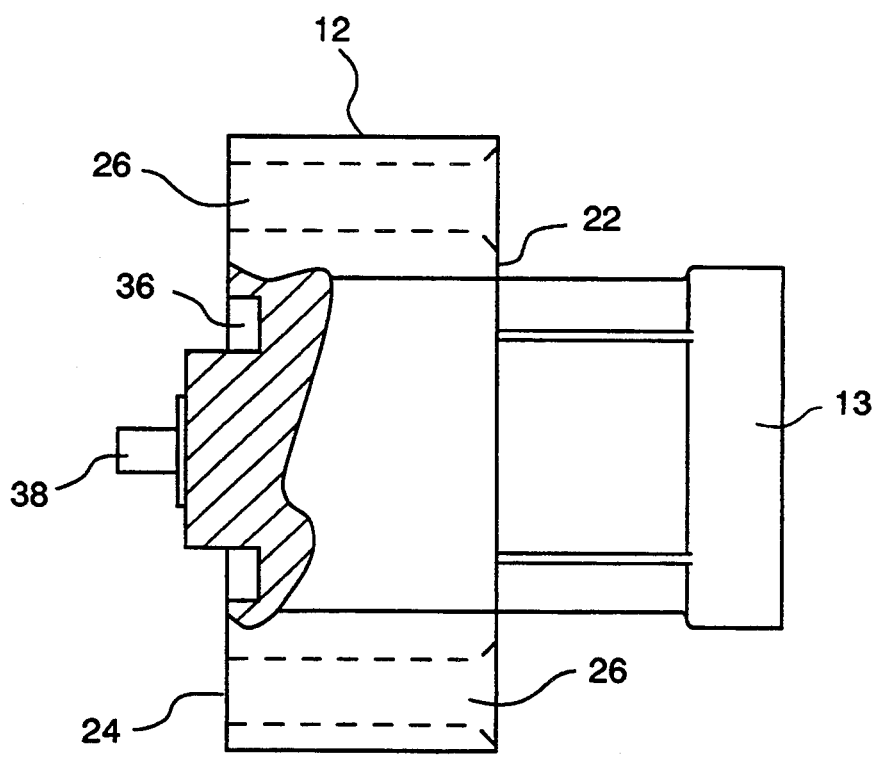
FIG. 2 is a top view of the apparatus shown in FIG. 1 separate from the vibrating surface and partially broken away to illustrate the groove.

As previously mentioned and illustrated in FIGS. 1 and 2, the O-ring 20 is preferably positioned in the groove 36 of the second surface 24 of the sensor 12. The O-ring 20, also commercially available from Parker Seal Company, has a thickness between 0.100" and 0.106" and is adapted to abut the vibrating surface 14, spacing the sensor 12 from the vibrating surface and the sleeve 16. The O-ring 20 is characterized by Durometer, tensile strength and ultimate elongations similar to that of O-ring 18.

For assembly purposes, each sleeve 16 receives an O-ring 18, such that the O-ring rests against, or abuts, the flange 34. The sleeves 16 are then inserted into a respective bore 26, such that the O-rings 18 are positioned at the chamfer 25 between the first surface and the flange 34 where it overlays the first surface and the second gap 32. With the O-ring 20 positioned in the groove 36, the sensor 12 and sleeve 16 assembly is placed against the vibratable surface 14, such that the sleeves 16 and the O-ring 20 engage the vibratable surface. The rotary mechanism of the sensor 12 includes a tang 38 which preferably engages and is rotated by the drivetrain component. Bolts 28 are then inserted through the sleeves 16 and into threading engagement with the vibrating surface 14, to attach the sleeves 16 to the vibrating surface 14. A thread lock, such as a dry adhesive or the like, could be utilized to help ensure the bolts 28 remain engaged with the vibrating surface 14. As the sleeves 16 are attached to the vibratable surface 14 (i.e. the bolts 28 are tightened), the O-rings 18 are compressed between the chamfer 25, the sleeve 16 and the flange 34, and the O-ring 20 is compressed between the vibratable surface 14 and the second surface 24 of the sensor 12. Thus, the sensor 12 "floats" between the O-rings 18 and the O-ring 20 in isolation from the surface 14 when it vibrates, the sleeve 16 and the flange 34.

It should be noted that the O-ring 18, when so compressed between the sleeve 16 and the sensor 12, prevents the sleeve 16 from rotating or "walking" relative to the sensor 12 as the bolts 28 are tightened. In the preferred embodiment, the bolts 28 are tightened to about 21–27 in-lbs. It should also be noted that the O-ring 20, when so compressed between the vibrating surface 14 and the second surface 24, prevents the sensor 12 from moving and coming into contact with the sleeve 16. Such contact would impart vibrations from the vibrating surface 14 to the sensor 12. Additionally, O-ring 20 preferably provides a fluid seal between the vibrating surface 14 and the sensor 12, preventing certain external contaminants from penetrating the rotating mechanism of the sensor. This construction also prevents binding of the rotating mechanism resulting from distortion of the sensor 12 as the bolts 28 are tightened to the vibrating surface 14, due to production inaccuracies of the sensor, such as molding flash and the like.

Figure 5:
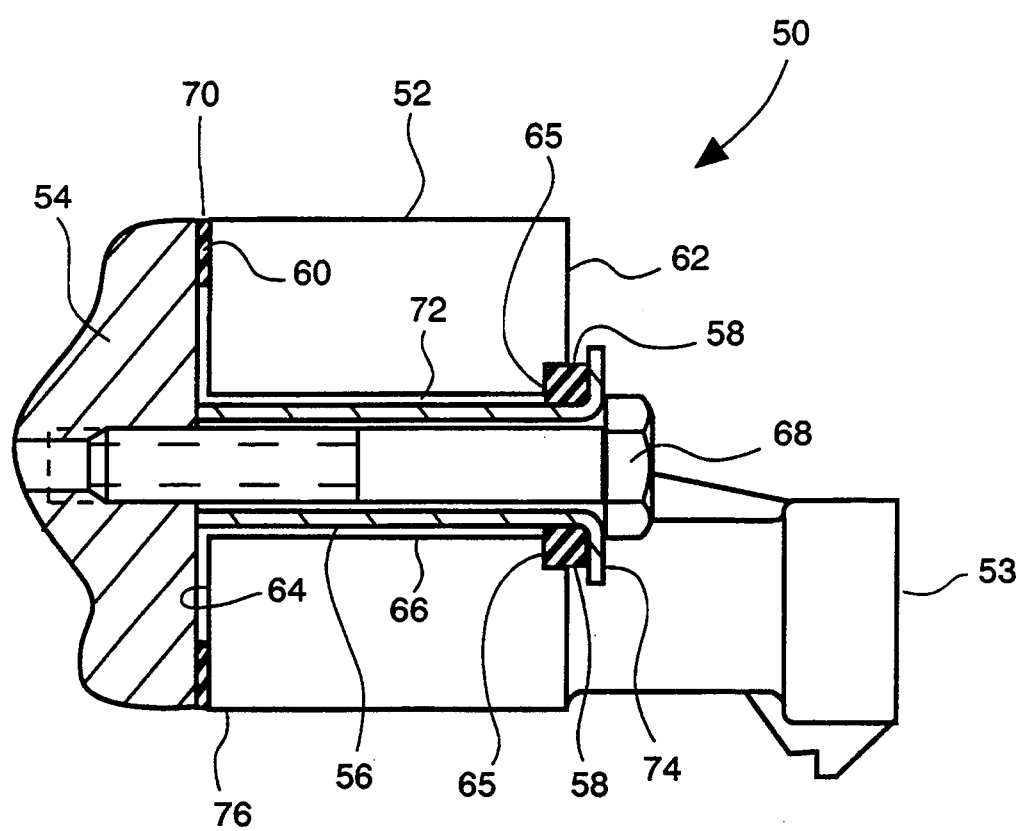
FIG. 5 is a fragmentary cross-section and partially broken away view of a second embodiment of the apparatus of the present invention.
Figure 6:
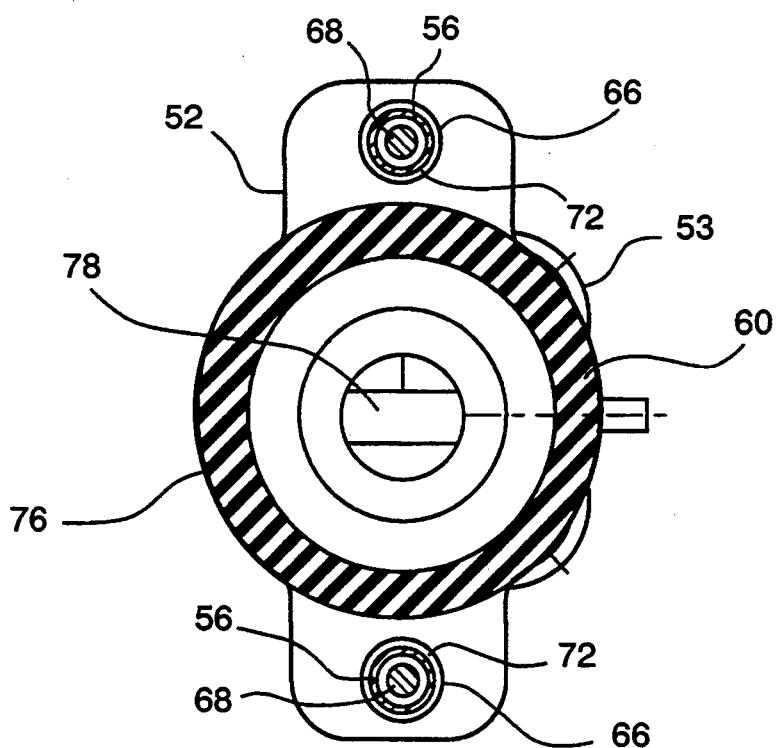
FIG. 6 is an end view, similar to FIG. 3, of the apparatus shown in FIG. 5, separate from the vibrating surface and separate from the vibrating surface and illustrating the side of the sensor proximate the vibrating surface.

Referring now to FIGS. 5 and 6, there is illustrated a second embodiment of an apparatus, shown generally by reference numeral 50, for isolating a sensor 52 from a vibrating surface 54. As in the previous embodiment, the sensor 52 is a commercially available rotary potentiometer and the vibrating surface is a vehicle drivetrain component, such as an electrically actuated shift mechanism, subject to 3-axis, high-frequency vibrations from transmission gearing and the like. The sensor 52 is directly mounted and fixedly attached to the vibrating surface 54. As best shown in FIG. 5, the apparatus 50 includes a pair of sleeves 56 (only one shown), first elastomeric isolation means, or grommets, 58 (only one set shown) and second elastomeric isolation means, or O-ring, 60. The sensor 52 includes a connector portion 53 which receives a mating connector portion not specifically illustrated. The apparatus 50 is substantially similar to the apparatus 10 shown in FIG. 1, with the exception of the grommets 58 and the groove 76, as described in greater detail below.

The sensor 52 has a first surface 62, a second surface 64 spaced from the first surface and a pair of bores 66, which both preferably extend through the sensor 52 between the first surface 62 and the second surface 64. As illustrated, a pair of pockets 65 are formed on the first surface 62 about each bore 66, in which the grommets 58 are positioned, as described in greater detail below. In the preferred embodiment, the pockets 65 are spaced approximately 180° from each other. The second surface 64 of the sensor 52 includes a groove 76 formed at the outer edge which receives the O-ring 60, as described in greater detail herein below. The groove 76 is generally circular in shape, having a depth of approximately 0.087".

With continuing reference to FIGS. 5 and 6, each bore 66 receives attaching means, such as a bolt 68 or the like, which cooperates with the sleeve 56 for fixedly attaching the sensor 52 to the vibratable surface. As previously mentioned, the apparatus 50 preferably includes a pair of sleeves 56, each adapted to extend through a respective bore 66 to the vibratable surface 54.

As shown in FIGS. 5 and 6, each sleeve 56 preferably has a sufficient length such that when the sleeve extends through a bore 66 to the vibrating surface 54, a first gap 70 is provided between the vibrating surface and the second surface 64 of the sensor. Each sleeve 56 also preferably has a diameter that is sufficiently small such that the sleeve 56 extends through the bore 66, a second gap 72 is provided between the sleeve 56 and the sensor in the bore.

As in the previous embodiment, each sleeve 56 includes a flange 74. As shown in FIG. 5, the flange 74 is sized to overlay the first surface 62 of the sensor 52 and the second gap 72. Of course, the sleeve 56 could be generally tubular and cooperate with a washer similarly sized to overlay the first surface 62 of the sensor 52 and the second gap 72. Alternatively, the sleeve 56 and the flange 74 are preferably formed as a unitary piece.

As best shown in FIG. 5, a pair of grommets 58 are positioned between the first surface 62 of the sensor 52 and the flange 74 where it overlays the first surface and the second gap 72, in the pockets 65. In the preferred embodiment, the grommets 58 are constructed of an elastomeric material, such as rubber. Most preferably, the grommets 58 have a Durometer hardness of about 70, a tensile strength in the range of 7-14 MPa and a minimum percent ultimate elongation of about 175. As shown in FIG. 5, the grommets 58 space the sensor 52 from the sleeve 56 and the flange 74.

As previously mentioned, the O-ring 60 is preferably positioned in the groove 76 of the second surface 64. The O-ring 60 has a thickness between 0.100" and 0.106" and is adapted to abut the vibrating surface 54, spacing the sensor 52 from the vibrating surface and the sleeve 56. The O-ring 60 is characterized by Durometer, tensile strength and ultimate elongations similar to that of O-ring 20 shown in FIG. 1.

For assembly, each sleeve 56 is inserted into a respective bore 66 with the grommets 58 positioned between the flange 74 and the first surface 62 in pockets 65. With the O-ring 60 positioned in the groove 76, the sensor 52 and sleeve 56 assembly is placed against the vibratable surface 54, such that the sleeves and the O-ring 60 engage the vibratable surface. The rotary mechanism of the sensor 12 includes a tang 78 which preferably engages and is rotated by the drivetrain component. Bolts 68 are then inserted through the sleeves 56 and into threading engagement with the vibratable surface 54, to attach the sleeves 56 to the vibratable surface. A thread lock, such as a dry adhesive or the like, could be utilized to help ensure the bolts 68 remain engaged with the vibrating surface 14. As the sleeves 56 are attached to the vibratable surface 54 (i.e. the bolts 68 are tightened), the grommets 58 are compressed between the first surface 62 of the sensor and the flanges 74 of the sleeves, and the O-ring 60 is compressed between the vibratable surface and the second surface 64 of the sensor 52. Thus, the sensor 52 "floats" between the grommets 58 and the O-ring 60 in isolation from the vibratable surface 54, the sleeve 56 and the flange 74.

It should be noted that the grommets 58, when so compressed between the flange 74 and the first surface 62, prevent the sleeve 56 from rotating or "walking" relative to the sensor 52 as the bolts 68 are tightened. In the preferred embodiment, the bolts 68 are tightened to about 21-27 in-lbs. Since the grommets 58 are generally cubed, i.e. square-shaped, as shown in FIG. 5, they provide a collaring effect to the flanges.

It should be noted that the O-ring 60, when so compressed between the vibrating surface 54 and the second surface 64, prevents the sensor 52 from moving relative to and contacting the sleeve 56. Such contact would impart vibrations from the vibrating surface 54 to the sensor. Additionally, O-ring 60 preferably provides a fluid seal between the vibrating surface 54 and the sensor 52 when the bolts are properly tightened, preventing certain external contaminants from penetrating the rotating mechanism of the sensor. This construction also prevents binding of the rotating mechanism resulting from distortion of the sensor 52 as the bolts 68 are tightened to the vibratable surface 54, due to production inaccuracies of the sensor, such as molding flash and the like.

It is to be understood, of course, that while the forms of the invention described above constitute the preferred embodiments of the invention, the preceding description is not intended to illustrate all possible forms thereof. It is also to be understood that the words used are words of description, rather than limitation, and that various changes may be made without departing from the spirit and scope of the invention, which should be construed according to the following claims.

What is claimed is:

1. Apparatus for isolating a sensor from a vibrating surface, the sensor having first and second spaced surfaces, a bore extending between the surfaces and a groove in the second surface, the apparatus comprising:

a sleeve extending through the bore to the vibrating surface, the sleeve being sufficiently long when extending through the bore to provide a first gap between the vibrating surface and the second surface of the sensor and sufficiently narrow when extending through the bore to provide a second gap between the sleeve and the sensor in the bore, washer means cooperating with said sleeve and overlaying the first surface of the sensor and the second gap;

means for fixedly attaching the sleeve and said washer means to the vibrating surface, the attaching means extending through the bore and into engagement with the vibrating surface;

a first elastomeric isolation means positioned between the first surface of the sensor and the washer means where it overlays the first surface and the second gap, the first elastomeric isolation means spacing the sensor from the sleeve and the washer means; and a second elastomeric isolation means positioned in the groove of the second surface and abutting the vibrating surface and space the sensor from the vibrating surface and the sleeve, such that the sensor floats between the first and second elastomeric isolation means in isolation from the sleeve, the washer means and the vibrating surface.

2. The apparatus of claim 1 wherein the sleeve and the washer means are formed as a unitary piece.

3. The apparatus of claim 1 wherein the sleeve and the washer means are formed as a flanged sleeve.

4. The apparatus of claim 1 wherein the first and second elastomeric isolation means are O-rings.

5. The apparatus of claim 1 wherein the second elastomeric isolation means provides a fluid seal between the vibrating surface and the sensor.

6. The apparatus of claim 1 wherein the first elastomeric isolation means comprises a plurality of grommets.

7. Apparatus for isolating a sensor from a vibrating surface, the sensor having first and second spaced surfaces, a bore extending between the surfaces and a groove in the second surface, the apparatus comprising:

a sleeve extending through the bore to the vibrating surface, the sleeve being sufficiently long when extending through the bore to provide a first gap between the vibrating surface and the second surface of the sensor and sufficiently narrow when extending through the bore to provide a second gap between the sleeve and the sensor in the bore, the sleeve including a flange at one end overlaying the first surface of the sensor and the second gap;

means for fixedly attaching the sleeve to the vibrating surface, the attaching means extending through the bore and into engagement with the vibrating surface;

a first elastomeric isolation means positioned between the first surface of the sensor and the sleeve flange where it overlays the first surface and the second gap, the first elastomeric isolation means spacing the sensor from the sleeve and the flange; and a second elastomeric isolation means positioned in the groove of the second surface and abutting the vibrating surface and space the sensor from the vibrating surface and the sleeve, such that the sensor floats between the first and second elastomeric isolation means in isolation from the sleeve and the vibrating surface.

8. The apparatus of claim 7 wherein the first and second elastomeric isolation means are O-rings.

9. The apparatus of claim 7 wherein the second elastomeric isolation means provides a fluid seal between the vibrating surface and the sensor.

10. The apparatus of claim 7 wherein the first elastomeric isolation means comprises a plurality of grommets.

11. In combination with a vibrating surface, apparatus for isolating a sensor from the vibrating surface, the sensor having first and second spaced surfaces, a bore extending between the surfaces and a groove in the second surface, the apparatus comprising:

a sleeve extending through the bore to the vibrating surface, the sleeve being sufficiently long when extending through the bore to provide a first gap between the vibrating surface and the second surface of the sensor and sufficiently narrow when extending through the bore to provide a second gap between the sleeve and the sensor in the bore, the sleeve including a flange at one end overlaying the first surface of the sensor and the second gap;

means for fixedly attaching the sleeve to the vibrating surface, the attaching means extending through the bore and engaging the vibrating surface;

a first elastomeric isolation means positioned between the first surface of the sensor and the sleeve flange where it overlays the first surface and the second gap, the first elastomeric isolation means spacing the sensor from the sleeve and the flange; and a second elastomeric isolation means positioned in the groove of the second surface, the second elastomeric isolation means abutting the vibrating surface and spacing the sensor from the vibrating surface and the sleeve, such that the sensor floats between the first and second elastomeric isolation means in isolation from the sleeve and the vibrating surface.

12. The apparatus of claim 11 wherein the first and second elastomeric isolation means are O-rings.

13. The apparatus of claim 11 wherein the second elastomeric isolation means provides a fluid seal between the vibrating surface and the sensor.

14. The apparatus of claim 11 wherein the first elastomeric isolation means comprises a plurality of grommets.

* * * * *